3,328,442
ANTI-RADIATION COMPOUNDS AND THEIR PREPARATION

William O. Foye, Boston, and James Mickles, Needham, Mass., and Ronald N. Duvall, Elkhart, Ind., assignors to Massachusetts College of Pharmacy, Boston, Mass., a corporation of Massachusetts
No Drawing. Filed Dec. 18, 1963, Ser. No. 331,358
11 Claims. (Cl. 260—438.1)

This application is a continuation-in-part of application Ser. No. 186,352, filed Apr. 10, 1962, now abandoned.

This invention relates to methods of minimizing the harmful effects of ionizing radiation on animal cells, to compositions useful therein, and to methods of preparing the compositions.

It is known that 2-mercaptoethylamine (MEA)

$$HS-CH_2-CH_2-NH_2$$

and S-(2'-aminoethyl)-2-thiopseudourea (AET)

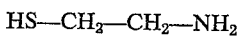

$$NH_2-\overset{NH}{\underset{\|}{C}}-S-CH_2-CH_2-NH_2$$

and the acid addition salts thereof have protective effects on animal cells against ionizing radiation. These compounds, however, are somewhat toxic and it is the principal object of the present invention to prepare effective derivatives with significantly reduced toxicity.

In accordance with the present invention, it has been found that the trithiocarbonate zwitterion and lower S-acyl derivatives of MEA have both the desired activity and reduced toxicity. The S-acyl derivatives are preferred in the form of their acid addition salts, preferably the hydrochloride or hydrobromide, since in this form the nitrogen atoms are ionized and more stable. The presence of acid also aids in acylating the sulfur rather than the nitrogen atoms. These derivative compounds are as follows:

(1) 2-aminoethyltribiocarbonate zwitterion:

$$^+NH_3-CH_2-CH_2-S-\overset{S}{\underset{\|}{C}}-S^-, \text{ and}$$

(2) S-acyl 2-mercaptoethylamines:

$$R^1-\overset{O}{\underset{\|}{C}}-S-CH_2-CH_2-NH_2$$

where $R^1$ is phenyl or lower alkyl.

In basic solution AET is believed to undergo rearrangement to 2-mercaptoethylguanidine (MEG)

$$HS-CH_2-CH_2-NH-\overset{NH}{\underset{\|}{C}}-NH_2$$

and most of the AET derivatives are in the MEG form. The novel derivatives of AET found to be useful are listed below.

(3) N - alkyl - 2-guanidylethyltrithiocarbonate zwitterions:

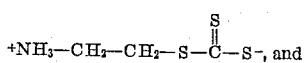

$$-S-\overset{S}{\underset{\|}{C}}-S-CH_2-CH_2-NH_2-\overset{HNR^{2+}}{\underset{\|}{C}}-N(R^2)_2$$

where $R^2$ is hydrogen or lower alkyl.

(4) N,S-diacyl-2-mercaptoethylguanidines:

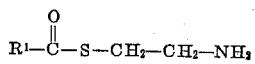

$$R_3-\overset{O}{\underset{\|}{C}}-S-CH_2-CH_2-NH-\overset{NH}{\underset{\|}{C}}-NH-\overset{O}{\underset{\|}{C}}-R^3$$

where $R^3$ is lower alkyl.

(5) N-amino-2-guanidylethyltrithiocarbonate zwitterion:

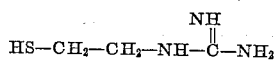

$$-S-\overset{S}{\underset{\|}{C}}-S-CH_2-CH_2-NH-\overset{NH_2+}{\underset{\|}{C}}-NH-NH_2$$

(6) N-alkyl-2-mercaptoethylguanidines:

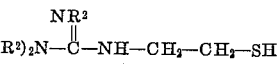

$$(R^2)_2N-\overset{NR^2}{\underset{\|}{C}}-NH-CH_2-CH_2-SH$$

where $R^2$ is hydrogen or lower alkyl.

Alkyl as used above is to be understood to include both acyclo-alkyl and cyclo-alkyl radicals.

In each of the foregoing derivative compounds, propylene radicals can be substituted for the ethylene radical separating sulfur and nitrogen atoms. For example, the following propylene compound is illustrative:

(7) 3-guanidylpropyltrithiocarbonate zwitterion:

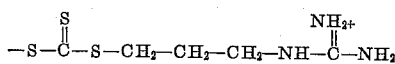

$$-S-\overset{S}{\underset{\|}{C}}-S-CH_2-CH_2-CH_2-NH-\overset{NH_2+}{\underset{\|}{C}}-NH_2$$

The foregoing compositions can be administered orally or by intraperitoneal injection, for example in a 2% aqueous solution to which 0.2% by weight carboxymethyl cellulose can be added if desired. 1 to 3% aqueous solutions at about pH 7.2 are preferred. The compounds are believed to release MEA or MEG slowly in vivo by hydrolysis. The compositions should be administered within about one-half hour before exposure to radiation, preferably about 15 minutes before exposure. The compositions can also be applied to the skin in the form of protective creams.

This invention is illustrated by the following examples.

EXAMPLE 1

*2-aminoethyltrithiocarbondte zwitterion*

A solution of 0.1 mole (11.3 gm.) of MEA·HCl in 20 ml. water was added dropwise with stirring to an ice-cooled mixture of 0.1 mole (7 ml.) of carbon disulfide and 0.32 mole (22 ml.) of concentrated ammonia. Stirring was continued for one hour after the addition was complete, and the yellow product was isolated, washed with ethanol, and dried rapidly on blotting paper at room temperature. The product was stored in a desiccator under nitrogen at refrigerator temperature. The yield was 10 gm. (65%) of material having an M.P. of 76–78° C.

The rapid drying, preferably within about one-half hour or less, and the immediate storage under an inert atmosphere and at reduced temperature are important in preparing and maintaining this compound.

EXAMPLE 2

*S-benzoyl-2-mercaptoethylamine hydrochloride*

A mixture of 0.05 mole of MEA·HCl and 10 ml. of benzoyl chloride was refluxed until the mixture solidified. The product was washed with benzene and ether and re-crystallized from absolute ethanol. The yield was 70% of material having an M.P. of 170–172° C.

EXAMPLE 3

*S-acetyl-2-mercaptoethylamine hydrochloride*

0.05 mole of MEA·HCl and 10 ml. of acetyl chloride were refluxed for one-half hour. The product was washed with benzene and ether and dried, with a yield of 85%. M.P. 130–132° C.

EXAMPLE 4

*S-octanoyl-2-mercaptoethylamine hydrochloride*

0.09 mole of MEA·HCl and 30 ml. of octanoyl chloride were refluxed until homogeneous. The product was washed with benzene and ether, re-crystallized from absolute ethanol, and dried, with a yield of 50%. M.P. 111–113° C.

EXAMPLE 5

*S-myristoyl-2-mercaptoethylamine hydrochloride*

0.04 mole of MEA·HCl and 15 ml. of myristoyl chloride were refluxed until solidification took place. The product was washed with benzene, ether, and water, and dried with a yield of 40%. M.P. 126–128° C.

Acyl derivatives of MEA hydrochloride have been similarly prepared from acyl chlorides having from 4 to 7 carbons by substituting the respective acyl chloride for those illustrated above in Examples 2 to 5, using benzene-ether as a purification solvent, one-half hour as a reaction time, and with yields ranging from 55 to 86%.

EXAMPLE 6

*2-guanidylethyltrithiocarbonate zwitterion (GET)*

A solution of AET·2HBr (0.1 mole) in 30 ml. of water was added dropwise to a mixture of 0.1 mole of carbon disulfide and 0.6 mole of concentrated ammonia at ice bath temperature with constant stirring. The yellow product was isolated, washed with water, and dried at room temperature, with a yield of 59%. M.P. 140–142° C.

EXAMPLE 7

*N,S-dihexanoyl-2-mercaptoethylguanidine hydrochloride*

Fifteen ml. of hexanoyl chloride were added to 3.0 gm. (0.015 mole) of the previous product (GET) in a round-bottom flask. The mixture was warmed on a water bath. Effervescence took place and the material dissolved in the excess hexanoyl chloride. The solution was heated on a water bath for an additional hour. After cooling, 200 ml. of ether was added and the solution was refrigerated. The white crystals, which formed on standing, were filtered and washed with ether. The yield was 1.4 gm. (25.9% of theoretical). The melting point was 83–86° C. The compound was slightly soluble in water, very soluble in alcohol, and gave a negative sulfhydryl test using dilute iodine solution.

EXAMPLE 8

*N,S-dioctanoyl-2-mercaptoethylguanidine hydrochloride*

Fifteen ml. of octanoyl chloride were added to 3.5 gm. (0.018 mole) of GET. The mixture was heated on a steam bath. Effervescence and solution took place in a few minutes. The solution was cooled and approximately 200 ml. of ether were added. The resulting solution was refrigerated and white crystals formed on standing. These crystals were filtered and washed with ether. The yield, after drying, was 3.95 gm. (54.0% of theoretical). The melting point was 94–95° C. The compound was slightly soluble in water, very soluble in alcohol, and gave a negative sulfhydryl test using a dilute iodine solution.

EXAMPLE 9

*N,S'-diheptanoyl-2-mercaptoethylguanidine hydrochloride*

Twelve ml. of heptanoyl chloride were added to 3.75 gm. of GET. The mixture was refluxed on a water bath for one hour. Effervescence and solution took place during this time. After cooling, 200 ml. of ether were added and the solution was refrigerated. White crystals formed on standing and were filtered, washed with ether, and air dried. The yield was 1.6 gm. (22.0% of theoretical). The melting point was 87–89° C. The compound was slightly soluble in water, very soluble in alcohol, and gave a negative sulfhydryl test using iodine solution.

EXAMPLE 10

*N,N'-dicyclohexyl-2-guanidylethyltrithiocarbonate zwitterion*

Twelve gm. (0.05 mole) of N,N'-dicyclohexylthiourea was refluxed with 40 ml. of absolute alcohol. The mixture was cooled somewhat and 10.25 gm. (0.05 mole) of 2-bromoethylamine hydrobromide was added. The mixture was then refluxed for three hours during which time effervescence and solution took place. No product crystallized on cooling this solution. The solution at this point should have contained N,N'-dicyclohexyl AET. This solution was added dropwise with stirring to 10 ml. of concentrated ammonia water and 5 ml. of carbon disulfide contained in an ice bath. A yellow precipitate started to form immediately. This precipitate was filtered and dried. The product was suspended in absolute alcohol, filtered, and dried. The yield was 9.6 gm. (53.5% of theoretical). The melting point was 134–136° C.

EXAMPLE 11

*N-methyl-2-guanidylethyltrithiocarbonate zwitterion*

N-methyl-S-(2-aminoethyl)-2-thiopseudourea was prepared as follows. In a 250 ml. round-bottom flask, fitted with a reflux condenser, were placed 20 ml. of absolute ethanol and 4.5 gm. (0.05 mole) of methylthiourea. After the mixture had refluxed gently on a water bath for 5 minutes, all the methylthiourea dissolved. 2-bromoethylamine hydrobromide (10.25 gm., 0.05 mole) was added and the refluxing continued. After about 10 minutes, crystallization of the product began, accompanied by vigorous boiling of the solvent. The reaction mixture was refluxed for an additional 20 minutes. The product was filtered and washed with absolute ethanol. The yield was 10.9 gm. (73.9%) and the melting point was 211–213° C.

In a 150 ml. round-bottom flask surrounded by an ice bath were placed 2 ml. (0.025 mole) of carbon disulfide and 10 ml. of concentrated ammonia water. A solution of 7.4 gm. (0.025 mole) of the above N-methyl-S-(2-aminoethyl)-2-thiopseudourea dihydrobromide in 10 ml. of water was added dropwise with constant stirring. A yellow product was formed. The product was isolated and washed repeatedly with water. The yield was 3.7 gm. (70.8%) and the melting point was 159–161° C.

EXAMPLE 12

*N-amino-2-guanidylethyltrithiocarbonate zwitterion*

S,2-aminoethylisothiosemicarbazonium bromide hydrobromide was prepared as follows. In a 250 ml. round-bottom flask, fitted with a reflux condenser, were placed 80 ml. of absolute ethanol and 4.6 gm. (0.05 mole) of thiosemicarbazide. After being refluxed on a water bath for 30 minutes, a portion of the thiosemicarbazide dissolved. 2-bromoethylamine hydrobromide (10.25 gm., 0.05 mole) was added and the refluxing was continued. After about one and one-half hours, all the thiosemicarbazide was in solution. The product was not isolated.

To the above solution, cooled in an ice bath, were added an equal volume of water and 15 ml. of concentrated ammonia water. Carbon disulfide (4 ml., 0.05 mole) was added dropwise with constant stirring. A yellow precipitate was formed. The product was isolated and washed repeatedly with water. The yield was 2.2 gm. (21.0%) and the melting point was 131–132° C.

The corresponding N-amino-2-guanidylpropyltrithiocarbonate zwitterion can be prepared by substituting 2-bromopropylamine hydrobromide for the 2-bromoethylamine hydrobromide employed above.

EXAMPLE 13

*3-guanidylpropyltrithiocarbonate zwitterion*

In a 150 ml. round-bottom flask surrounded by an ice bath were placed 2 ml. (0.025 mole) of carbon disulfide and 10 ml. of concentrated ammonia water. A solution of 7.4 gm. (0.025 mole) of S,3-aminopropylisothiuronium bromide hydrobromide in 10 ml. of water was added dropwise with constant stirring. A yellow precipitate was formed. The product was isolated and washed repeatedly with water. The yield was 4.2 gm. (80.4%) and the melting point was 133–135° C.

EXAMPLE 14

*N-decyl-2-mercaptoethylguanidine hydrobromide*

To a solution of 7.5 gm. (0.035 mole) of decylthiourea in 35 ml. of absolute ethanol was added 8.2 gm. (0.04 mole) of bromoethylamine hydrobromide and the mixture was refluxed for 45 minutes. The solution was cooled to room temperature, was filtered, and was refrigerated. The precipitate was collected and dried, and a white powder was obtained.

To a solution of 2.0 gm. (0.005 mole) calculated as decyl-AET dihydrobromide) in 10 ml. of warm ethanol was added an excess of concentrated ammonium hydroxide. After refrigeration the precipitate was collected and was dried. A white powder was obtained.

Yield 1.0 gm. (80%). M.P. 98–100° C.

The following compounds have been tested at the Walter Reed Army Institute of Research for their anti-radiation and intraperitoneal toxicity properties in mice with the results recorded below in Tables I and II respectively.

TABLE I.—ANTI-RADIATION PROPERTIES OF MEA DERIVATIVES IN MICE

| Compound | Drug level, mg./kg. | Dose, r | 30-Day survival, Treated | Percent Controls |
| --- | --- | --- | --- | --- |
| S-acetyl-2-mercaptoethylamine | 400 | 800 | 60 | 0 |
|  | 400 | 575 | 80 | 20 |
| S-octanoyl-2-mercaptoethylamine | 600 | 800 | 60 | 0 |
|  | 600 | 575 | 90 | 50 |
| S-myristoyl-2-mercaptoethylamine | 400 | 800 | 0 | 0 |
|  | 400 | 575 | 65 | 35 |
| S-benzoyl-2-mercaptoethylamine | 225 | 800 | 10 | 0 |
|  | 225 | 575 | 85 | 75 |
| 2-aminoethyltrithiocarbonate zwitterion | 350 | 800 | 75 | 0 |
|  | 350 | 575 | 95 | 40 |

TABLE II.—INTRAPERITONEAL TOXICITIES OF MEA DERIVATIVES IN MICE [1]

| Compound | Dose in mice, mg./kg. | Mortality Acute | (Dead/total) 10 days |
| --- | --- | --- | --- |
| 2-mercaptoethylamine | [1] 230 |  |  |
| Do | [2] 350 |  |  |
| S-acetyl-2-mercaptoethylamine | 400 | 0/5 | 0/5 |
| Do | 500 | 2/5 | 4/5 |
| S-chloroacetyl-2-mercaptoethylamine | 800 | 0/5 | 0/5 |
|  | 1,000 | 0/5 | 4/5 |
| S-octanoyl-2-mercaptoethylamine | 650 | 0/5 | 0/5 |
|  | 800 | 1/5 | 2/5 |
| S-myristoyl-2-mercaptoethylamine | 400 | 0/5 | 0/5 |
|  | 800 | 0/5 | 4/5 |
| S-benzoyl-2-mercaptoethylamine | 250 | 0/5 | 0/5 |
|  | 350 | 2/3 | 4/5 |
| 2-aminoethyltrithiocarbonate zwitterion | 400 | 0/5 | 0/5 |
|  | 500 | 0/5 | 1/5 |
| Do | 600 | 4/5 | 5/5 |

[1] LD$_{50}$ value in rats obtained by F. Bonati, Arch. ital. sci. farmacol., 9, 125 (1959).
[2] LD$_{50}$ value in mice obtained by Z. M. Bacq and A. Herve, Schweiz. med. Wochschr., 82, 1018 (1952).

In the foregoing tables, the drug was administered by injection as 2% by weight aqueous solution containing 0.2% CMC 15 minutes prior to X-irradiation, the X-irradiation is measured in roentgens, and the fraction reported in the last two columns of Table II show the numbers of dead mice after the stated time over the total number of mice treated. A 30 day survival time was taken as the criterion for protection. The above derivative compounds produce none of the emetic effects observed after similar treatments with MEA and AET.

GET was similarly tested and found to give 100% protection in mice against 800 r. of X-irradiation.

Of the above compositions, the trithiocarbonate zwitterions of MEA and MEG and the acyl derivatives of MEA, wherein the acyl group has eight or fewer carbons, are preferred. GET is at present the most preferred compound.

As a further aspect of the present invention, it has been found that GET has anti-fungal properties in the form of its ferric and cupric chelates. This activity is comparable to that of oxine, a commercial fungicide used in the cupric or ferric complex form. The ferric and cupric chelates of GET were prepared as illustrated below in Examples 15 and 16.

EXAMPLE 15

The sodium salt of GET was prepared by suspending 0.1 mole of GET in 50 ml. of water and slowly adding with stirring 0.1 mole (4.0 gm.) of sodium hydroxide as a 20% by weight solution. The resulting yellow solution was filtered.

The ferric chelate was prepared by adding dropwise 50 ml. of a solution containing 4.6 gm. (0.017 mole) of ferric chloride hexahydrate to 35 ml. of a solution containing 8.75 gm. (0.05 mole) of the above sodium salt. A solution of 0.1 N sodium hydroxide was also added dropwise to maintain the pH above 8.0. A brown precipitate formed and was allowed to settle overnight. The supernatant liquid was decanted, the precipitate was isolated, and then washed with several volumes of water. The precipitate was then washed with ethyl ether and dried at atmospheric pressure under warm air with a yield of 90%.

EXAMPLE 16

The cupric chelate of the sodium salt of GET was prepared by adding dropwise 50 ml. of a solution containing 6.25 gm. (0.025 mole) of cupric sulfate pentahydrate to 35 ml. of a solution containing 8.75 gm. (0.05 mole) of the sodium salt of GET. A solution of 0.1 N sodium hydroxide was also added dropwise to maintain the pH above 8. A brown precipitate was formed and allowed to settle overnight. The supernatant liquid was decanted, the precipitate was isolated and then washed with several volumes of water. The precipitate was then washed with ethyl ether and dried at atmospheric pressure under warm air with a yield of 90%.

Percentage composition values obtained for carbon-hydrogen and for the metal by an ashing procedure and for sulphur by a Parr bomb procedure have indicated that the chelates are unsaturated, i.e., 1:1 for the ferric ion and 1:1 for the cupric ion.

The cupric and ferric chelates prepared above were tested for anti-fungal properties as follows. Sterile Sabouraud's dextrose-agar was poured into sterile Petri plates, and the plates were divided into five sections. A small circle 1 cm. in diameter was removed from the center of each section. Four such plates were incubated with each test organism by generously coating the same with spores and hyphae of the organism. One-tenth gram of the chelate was then placed in the circle of each section. The plates were incubated in upright position with a piece of blotting paper underneath the cover to absorb moisture. The plates were placed in an oven at 25° C. for a period of 14 days to insure complete growth. At the completion of the required time, the zones of inhibition were measured from the edge of the circle to the beginning of growth. Four readings were taken and the average calculated. The results thus obtained are summarized below in Table III.

TABLE III

| Compound | Radius of Zones of Inhibition in Millimeters | | | |
|---|---|---|---|---|
| | Microsporum canis No. 10214 | Microsporum gypseum No. 9083 | Trichophyton rubrum No. 10218 | Trichophyton mentagrophytes No. 9533 |
| GET | 0 | 0 | 0 | 0 |
| Cupric chelate of GET | 44 | 10 | 43 | 44 |
| Ferric chelate of GET | 45 | 43 | 44 | 44 |

It should be understood that the foregoing description is for the purpose of illustration only, and that the invention includes all modifications falling within the scope of the appended claims.

We claim:

1. A new composition of matter selected from the group consisting of (1) 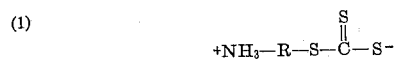

(2) 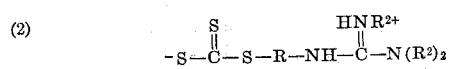

(3) 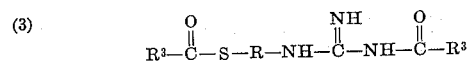

(4) 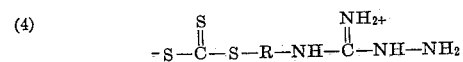

(5) 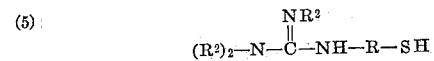

and acid addition salts thereof, wherein R is ethylene or propylene, $R^2$ is hydrogen or lower alkyl, and $R^3$ and $R^4$ are lower alkyl.

2. 2-aminoethyltrithiocarbonate zwitterion.
3. 2-guanidylethyltrithiocarbonate zwitterion.
4. N-amino-2-guanidylethyltrithiocarbonate zwitterion.
5. N-methyl-2-guanidyltrithiocarbonate zwitterion.
6. A new composition of matter having the formula

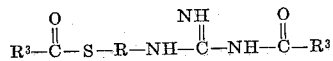

wherein R is ethylene or propylene and $R^3$ is lower alkyl.

7. The ferric complex of the compound according to claim 3.

8. The cupric complex of the compound according to claim 3.

9. The method of preparing 2-aminoethyltrithiocarbonate zwitterion which comprises treating 2-mercaptoethylamine with carbon disulfide in basic aqueous medium, isolating and rapidly drying the product, and storing said product at reduced temperature under an inert atmosphere in the presence of a moisture absorptive material.

10. The method of preparing 2-guanidylethyltrithiocarbonate zwitterion which comprises reacting S-(2'-aminoethyl)-2-thiopseudourea with carbon disulfide in basic aqueous medium at reduced temperature.

11. The method of preparing a compound having the structure $$R^3-\overset{O}{\underset{\|}{C}}-S-CH_2-CH_2-NH-\overset{NH}{\underset{\|}{C}}-NH-\overset{O}{\underset{\|}{C}}-R^3$$

which comprises reacting 2-guanidylethyltrithiocarbonate zwitterion with $R^3COCl$ with heat and isolating the resulting product, $R^3$ being lower alkyl.

References Cited

Johnson et al., Journal Org. Chem., vol. 26, pp. 3780 to 3783 (1961).

Foye et al., Journal Pharm. Science, vol. 51, No. 2, February 1962, pp. 168 to 171.

Kalkward, Nucleonics, vol. 18, No. 5, May 1960, pp. 76 to 81 and 130 to 131.

Phil et al., Pharmacol, Reviews, vol. 10, March through December 1958—p. 444.

TOBIAS E. LEVOW, *Primary Examiner.*

BENJAMIN R. PADGETT, CARL D. QUARFORTH, HELEN M. McCARTHY, *Examiners.*

L. A. SEBASTIAN, H. M. S. SNEED,
*Assistant Examiners.*